(12) United States Patent
Soderholm

(10) Patent No.: US 11,228,716 B2
(45) Date of Patent: Jan. 18, 2022

(54) VISION BASED BOUNDARY SETTING AND CALIBRATION OF A CAMERA

(71) Applicant: SIGNIFY HOLDING B.V., Eindhoven (NL)

(72) Inventor: Brian J. Soderholm, Peachtree City, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 91 days.

(21) Appl. No.: 16/670,663

(22) Filed: Oct. 31, 2019

(65) Prior Publication Data

US 2020/0137311 A1 Apr. 30, 2020

Related U.S. Application Data

(60) Provisional application No. 62/753,611, filed on Oct. 31, 2018.

(51) Int. Cl.
*H04N 5/232* (2006.01)

(52) U.S. Cl.
CPC ..... *H04N 5/23296* (2013.01); *H04N 5/23206* (2013.01); *H04N 5/23227* (2018.08)

(58) Field of Classification Search
CPC .......... H04N 5/23296; H04N 5/23227; H04N 5/23206
See application file for complete search history.

(56) References Cited

U.S. PATENT DOCUMENTS

2008/0273754 A1* 11/2008 Hick ................ G08B 13/19652
382/103

* cited by examiner

*Primary Examiner* — Twyler L Haskins
*Assistant Examiner* — Fayez A Bhuiyan

(57) ABSTRACT

A camera system includes a camera, a processor, and a memory. In response to a first commissioning signal, the camera system records a first image comprising a token in a first position. In response to a second commissioning signal, the camera system records a second image comprising the token in a second position. In response to a third commissioning signal, the camera system records a third image comprising the token in a third position. The camera system computes a field of interest boundary for a visual field of the camera system based on the first position, the second position, and the third position.

18 Claims, 8 Drawing Sheets

VISION BASED BOUNDARY SETTING AND CALIBRATION OF A CAMERA

RELATED APPLICATIONS

The present application claims priority to U.S. Provisional Patent Application No. 62/753,611 filed Oct. 31, 2018 and titled "Vision Based Boundary Setting and Calibration of a Camera," the entire contents of which are incorporated herein by reference.

TECHNICAL FIELD

Embodiments described herein relate generally to a luminaire with an integrated camera.

BACKGROUND

The use of cameras is becoming more prevalent for a variety of reasons, including tracking of items and people, monitoring of areas, and providing security. Luminaires provide a unique opportunity for integrating cameras, however, cameras can also be installed in ceilings or walls as stand alone systems. Improvements are needed in the manner in which cameras are commissioned or set up to operate when installed within a luminaire or as a stand alone camera system installed in a ceiling or wall.

SUMMARY

In one example embodiment, the disclosure is directed to a method for commissioning a camera system. The camera system comprises a camera, a processor, and a memory. The method comprises the steps of: recording, with the camera system in response to receiving a first commissioning signal, a first image, the first image comprising a token in a first position; recording, with the camera system in response to receiving a second commissioning signal, a second image, the second image comprising the token in a second position; and recording, with the camera system in response to receiving a third commissioning signal, a third image, the third image comprising the token in a third position. The method further comprises computing, by the camera system, a field of interest boundary for a visual field of the camera system based on the first position, the second position, and the third position.

In another example embodiment, the disclosure is directed to a computer-readable medium comprising instructions that when executed by a processor of a camera system perform the steps of: recording, with the camera system in response to receiving a first commissioning signal, a first image, the first image comprising a token in a first position; recording, with the camera system in response to receiving a second commissioning signal, a second image, the second image comprising the token in a second position; and recording, with the camera system in response to receiving a third commissioning signal, a third image, the third image comprising the token in a third position. The instructions further comprise computing, by the camera system, a field of interest boundary for a visual field of the camera system based on the first position, the second position, and the third position.

In another example embodiment, the disclosure is directed to a method for commissioning a camera system. The camera system comprises a camera, a processor, and a memory. The method comprises the steps of: in response to receiving a commissioning signal at the camera system, recording an image with the camera system. The image comprises a first token in a first position, a second token in a second position, and a third token in a third position. The method further comprises computing, by the processor, a field of interest boundary for a visual field of the camera system based on the first position, the second position, and the third position.

The foregoing embodiments are non-limiting examples. These and other aspects, objects, features, and embodiments will be apparent from the following description and the appended claims.

BRIEF DESCRIPTION OF THE DRAWINGS

The drawings illustrate only example embodiments of camera systems and are therefore not to be considered limiting of the scope of this disclosure. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

Figure 1:
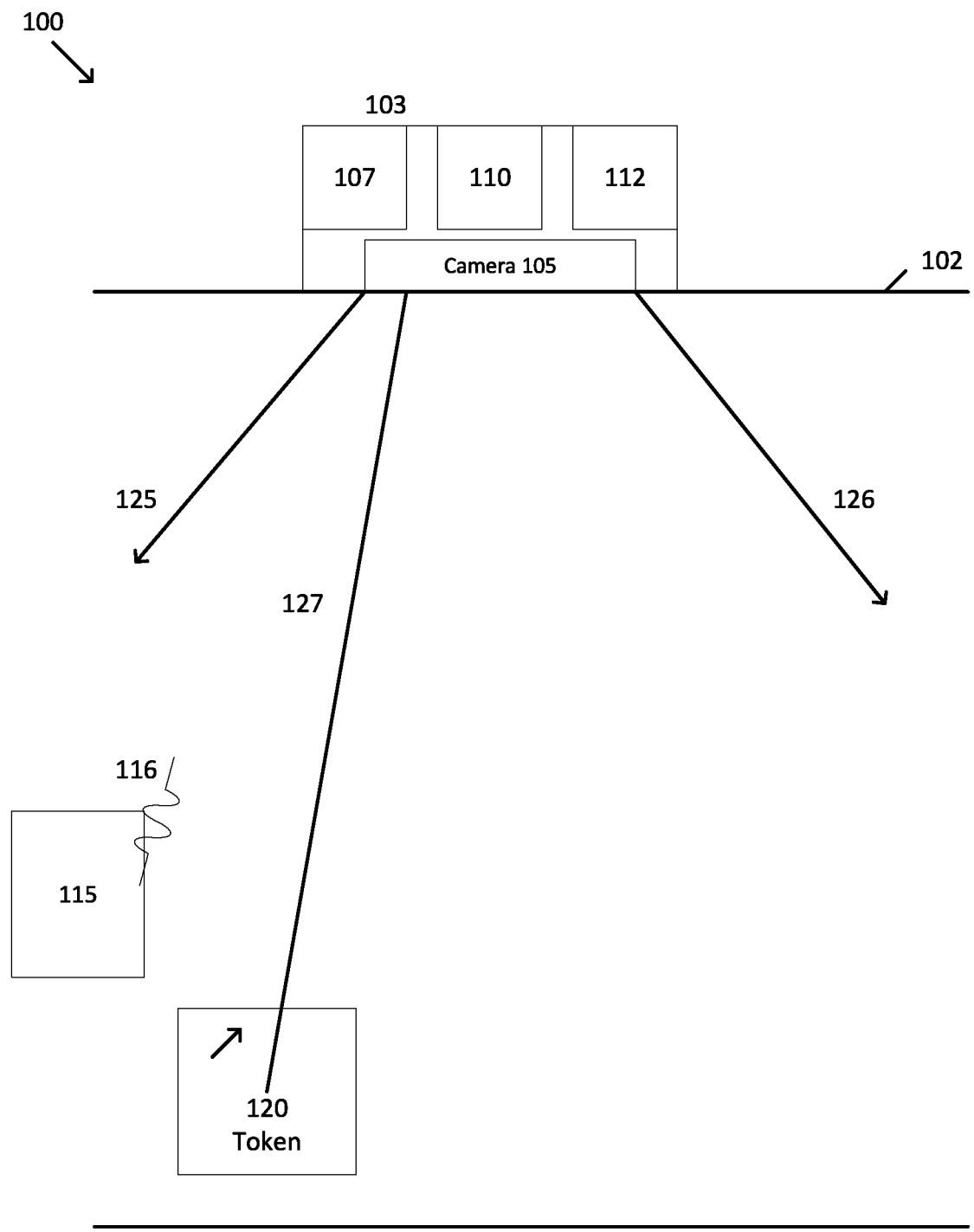
FIG. 1 is a schematic view of a first step for commissioning a camera installed in a ceiling in accordance with an example embodiment.

The example embodiments discussed herein are directed to systems, apparatuses, and methods relating to commissioning cameras. Commissioning refers to the process of configuring a camera's settings in preparation for day to day or long term operation of the camera. The cameras described herein can be installed in a luminaire, but are not required to be installed in a luminaire. For example, a camera or camera system can be a stand alone device installed in a ceiling or a wall. When installed in a luminaire, the example cameras described herein may be installed in a variety of indoor and outdoor luminaires, including luminaires in homes, offices, schools, garages, stadiums, warehouses, and a variety of other buildings and environments. The luminaires illustrated herein include a single camera integrated in a luminaire, however, in other embodiments the luminaire can include multiple integrated cameras located at various positions on the luminaire. Example embodiments can be used in any of a number of applications and/or environments.

In order to use cameras integrated in luminaires or ceilings more effectively, it can be helpful to set a field of interest for which the camera will collect images. For example, a field of interest can be set so that the camera only monitors items or people in a designated area. Additionally, a field of interest can be set for the camera so that the area monitored by the camera does not overlap with another area monitored by another camera. However, setting the boundaries of the field of interest for the camera can be challenging for a variety of reasons. For example, it may be desirable to set the camera's field of interest without having knowledge of the camera's orientation. As another example, it may be desirable for privacy, security, or network bandwidth reasons to be able to set the camera's field of interest without communicating images recorded by the camera to a network or other processing devices beyond the camera. As will be illustrated in the examples described herein, a camera system's field of interest and other calibration settings such as scale can be set without coordination over a network with other systems and without transmitting images from the camera system to other systems.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

Referring to FIGS. 1-4, an example luminaire 103 with an integrated camera 105 installed in a ceiling 102 is illustrated. The luminaire 103 can include a light source (not shown), the camera 105, a transceiver 107, a processor 110, and a memory 112. These components can be installed in a variety of positions within or on the luminaire and can be referred to as a camera system. A power source supplies power (e.g. 120V AC, 220V AC, 24V DC, 48V DC) to the luminaire 103. In the example of FIGS. 1-4, the luminaire 103 is oriented to direct light downward into a room 100 and the camera 105 is oriented to record images of an area within the room. The transceiver 107 enables wireless communication between the luminaire 107 and a commissioning device 115. The commissioning device can be a smart phone or another device capable of communicating with the transceiver 107. The commissioning device 115 can communicate with the transceiver 107 using any of a variety of communication methods including visible light, infrared light, and radio frequency waves. In one alternate embodiment, the transceiver 107 can be eliminated and visible or infrared light transmissions can be detected by the camera 105. In another alternate embodiment, the transceiver 107 can be eliminated and a user can interact with the camera 105 via a user interface such as a touch screen or a button. In yet another alternate embodiment, the transceiver 107 can be replaced with a receiver that receives wireless communications but does not transmit wireless communications.

FIGS. 1-4 illustrate an example method for setting a field of interest for camera 105 using a token 120. As shown in FIG. 1, camera 105 has a visual field indicated by boundary lines 125 and 126 which is the broadest possible range for which the camera can record an image. However, it may be desirable to narrow the range in which the camera 105 records images to a field of interest. The field of interest can be set in connection with commissioning the camera 105. As shown in FIG. 1, the commissioning process can begin when the transceiver 107 receives a first commissioning signal 116 from the commissioning device 115. In an alternative embodiment, the transceiver 107 and the commissioning device 115 can be eliminated and a commissioning signal can be provided to the camera by a user interface such as a touch screen or button. In response to receiving the first commissioning signal 116 at the transceiver 107, the processor 110 controls the camera 105 to record a first image of the room 100 which includes the token 120 in a first position. Straight line 127 connecting the camera 105 and the token 120 provides a first boundary line.

Figure 2:
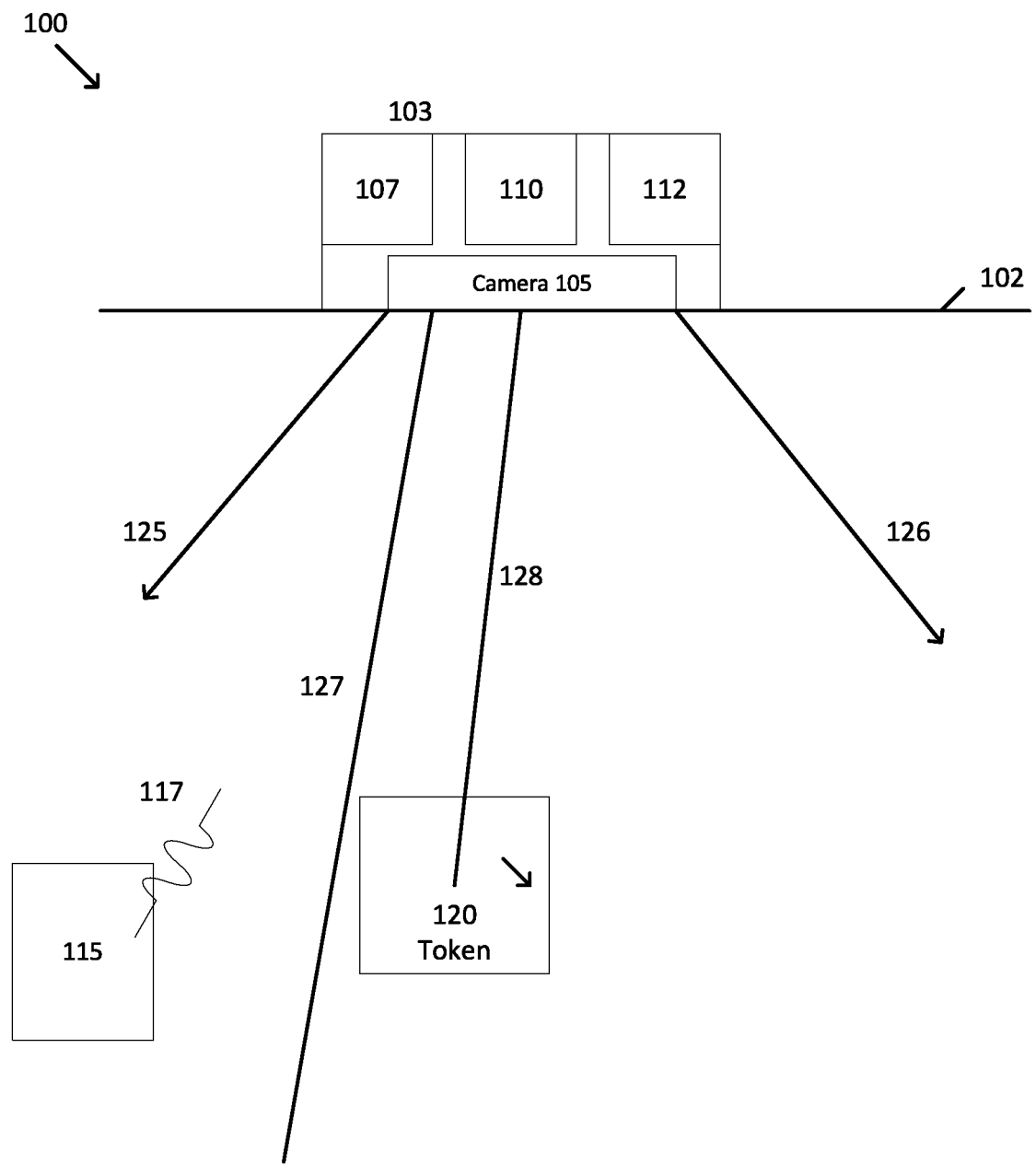
FIG. 2 is a schematic view of a second step for commissioning the camera of FIG. 1 in accordance with an example embodiment.

After the first image is taken, a technician can move the token 120 to a second position shown in FIG. 2. After the token 120 is moved to the second position, the technician can actuate the commissioning device 115 to send a second commissioning signal 117 to the transceiver 107. In response to receiving the second commissioning signal 117 at the transceiver 107, the processor 110 controls the camera 105 to record a second image of the room 100 which includes the token 120 in the second position. Straight line 128 connecting the camera 105 and the token 120 provides a second boundary line.

Figure 3:
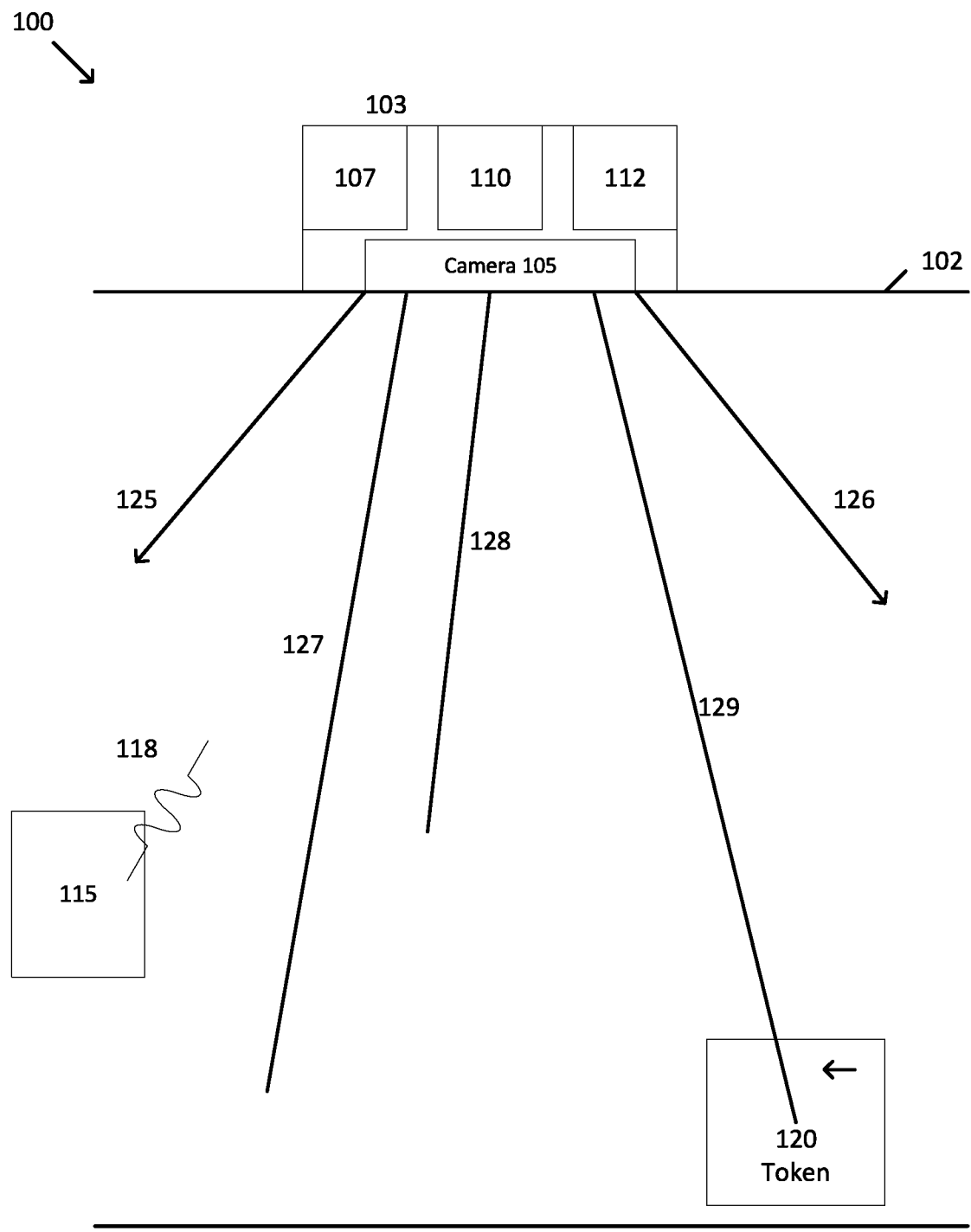
FIG. 3 is a schematic view of a third step for commissioning the camera of FIG. 1 in accordance with an example embodiment.

After the second image is taken, the technician can move the token 120 to a third position shown in FIG. 3. After the token 120 is moved to the third position, the technician can actuate the commissioning device 115 to send a third commissioning 118 signal 118 to the transceiver 107. In response to receiving the third commissioning signal at the transceiver 107, the processor 110 controls the camera 105 to record a third image of the room 100 which includes the token 120 in the third position. Straight line 129 connecting the camera 105 and the token 120 provides a third boundary line.

Figure 4:
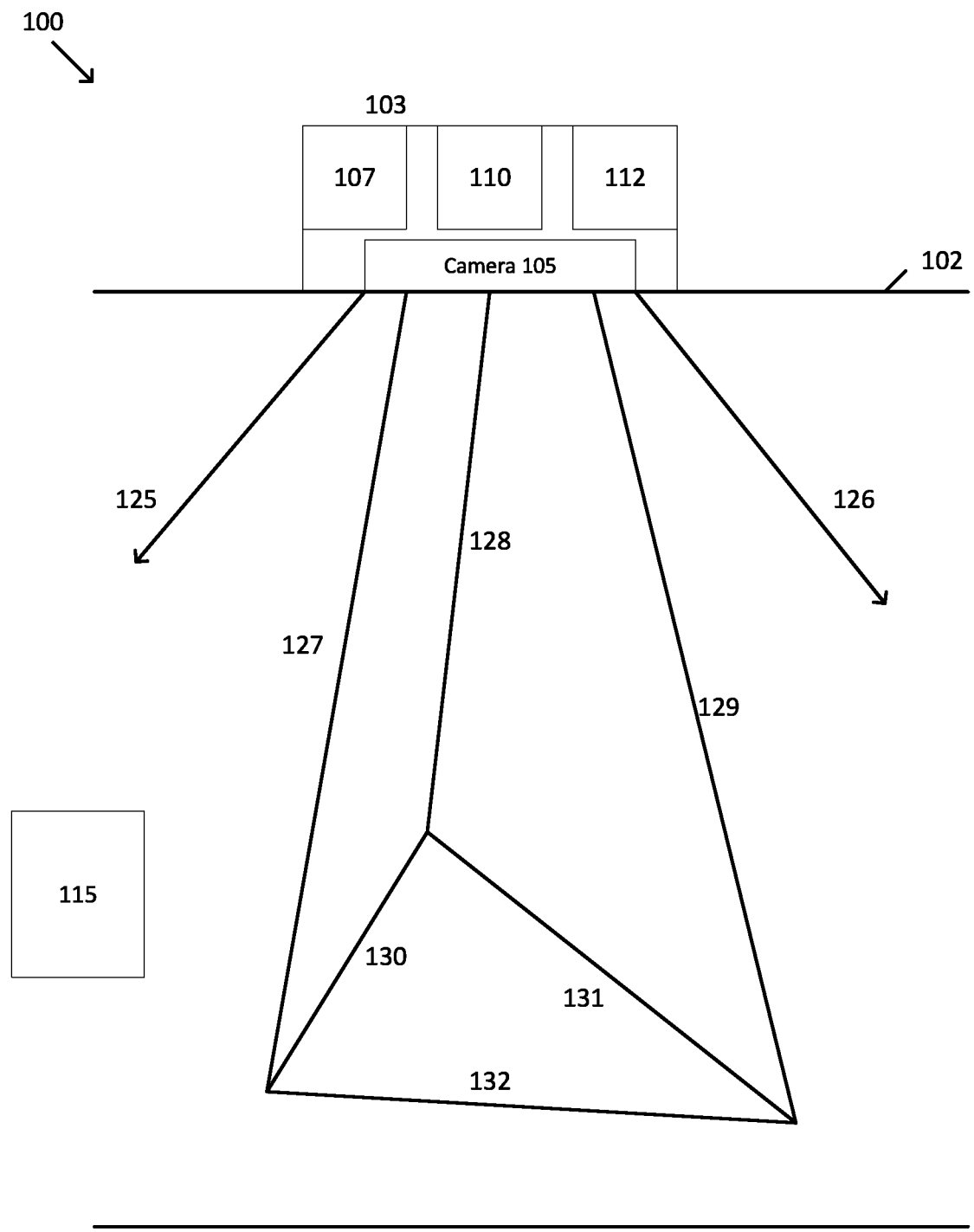
FIG. 4 is a schematic view of a fourth step for commissioning the camera of FIG. 1 in accordance with an example embodiment.

Using the three images with the token 120 in the three different positions, the processor can construct a boundary for the field of interest for the camera. The boundary for the field of interest in the example shown in FIG. 4 is defined by lines 127, 128, 129, 130, 131, and 132. The processor can use the images in a variety of ways to construct the boundary for the field of interest. In one example, the tokens can have an indicator such the arrow shown on the token 120 in FIGS. 1, 2, and 3 to indicate the direction of lines on the floor that form the boundary for the field of interest. In other example embodiments, other indicators, such as numbers, on the token(s) can be used to determine the position of the lines forming the boundary of the field of interest. As yet another example, the processor can be configured to create the largest possible area from the positions of the token(s) and that largest possible area forms the boundary for the field of interest. It should also be understood that although the example of FIGS. 1-4 shows placing the token 120 at three different positions, in other examples the token can be placed in four, five, or more positions to suit the shape of the boundary for the field of interest.

The token 120 can also be used to calibrate the camera 105 based on the mounting height of the camera. For example, mounting the camera at different heights changes the scale of objects in the images recorded by the camera 105. The processor 110 needs to be able to determine the scale of objects in the images in order to accurately identify the objects. If the token 120 is of known dimensions, the processor 110 can determine a number of pixels associated with the token 120 in the image and use the number of pixels to calculate the scale of objects in the image based on the known dimensions of the token 120. The dimensions of the token 120 can be stored in the memory 112 prior to installation of the luminaire 103 or in connection with the commissioning process.

Figure 5:
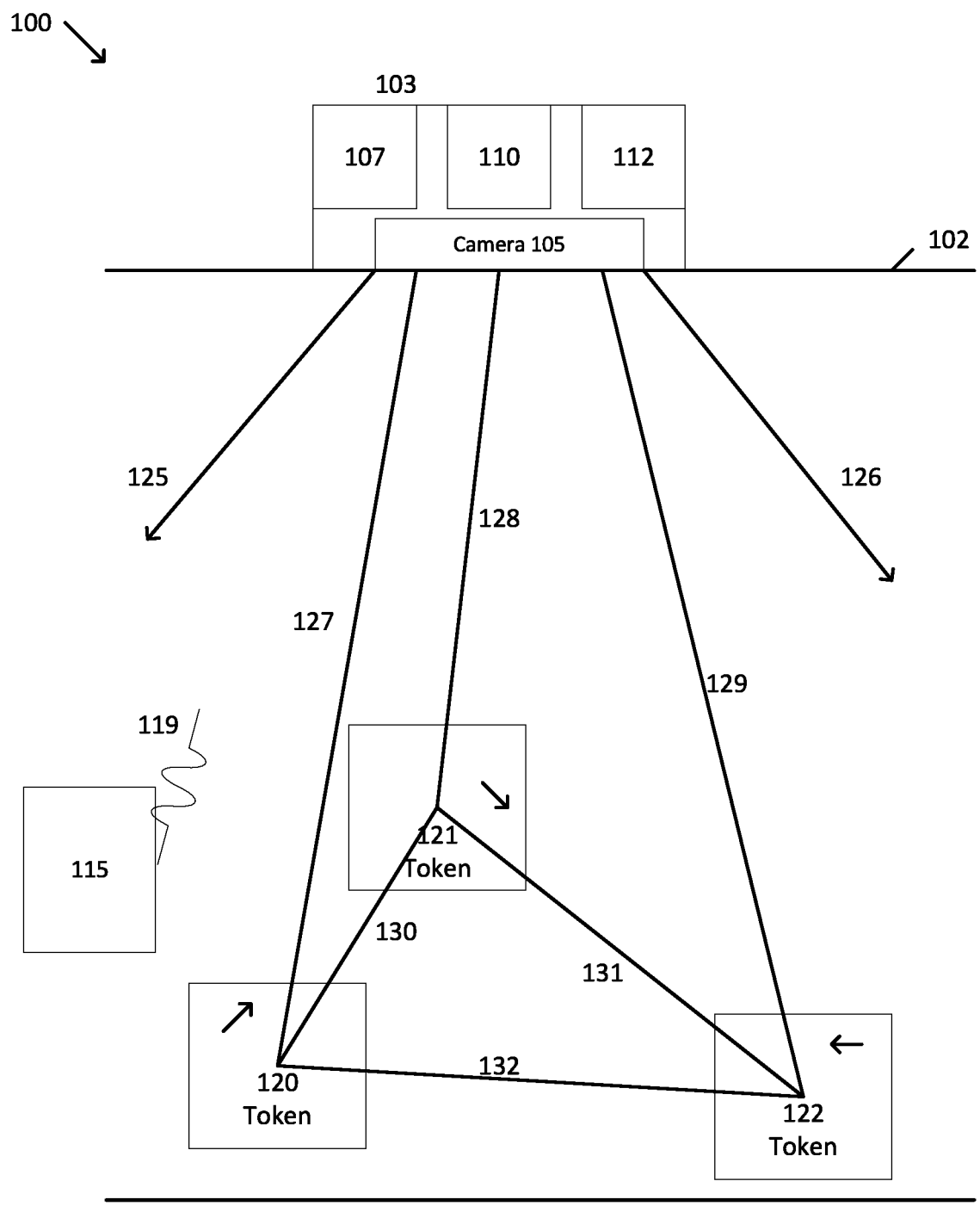
FIG. 5 is a schematic view of another method for commissioning a camera in accordance with an example embodiment.

Referring now to FIG. 5, an alternate method for setting the boundaries for a field of interest for a camera is illustrated in accordance with the example embodiments of this disclosure. The example illustrated in FIG. 5 differs from the example illustrated in FIGS. 1-4 in that a single image is recorded by camera 105 when the transceiver 107 receives a commissioning signal from the commissioning device 115. The example of FIG. 5 is further different in that multiple different tokens 120, 121, and 122 are placed in different positions in the image recorded by the camera 105. Instead of computing the boundaries of the field of interest by compiling information from multiple images as in the example of FIGS. 1-4, the example of FIG. 5 can compute the boundaries of the field of interest from the single image. Specifically, processor 110 can identify boundary lines 127, 128, and 129 by creating straight lines from camera 105 to tokens 120, 121, and 122, respectively. The processor 110 can determine boundary lines 130, 131, and 132 by creating straight lines between tokens 120, 121, and 122. As described above in connection with FIGS. 1-4, indicators such as arrows or numbers on the tokens can provide information to the processor as to how the positions of the tokens or the vertices of the field of interest should be connected. Alternatively, the processor can rely on computer-readable instructions to compute boundary lines that provide the largest area for the field of interest. It should also be understood that in other embodiments more than three tokens can be used to define the field of interest.

Figure 6:
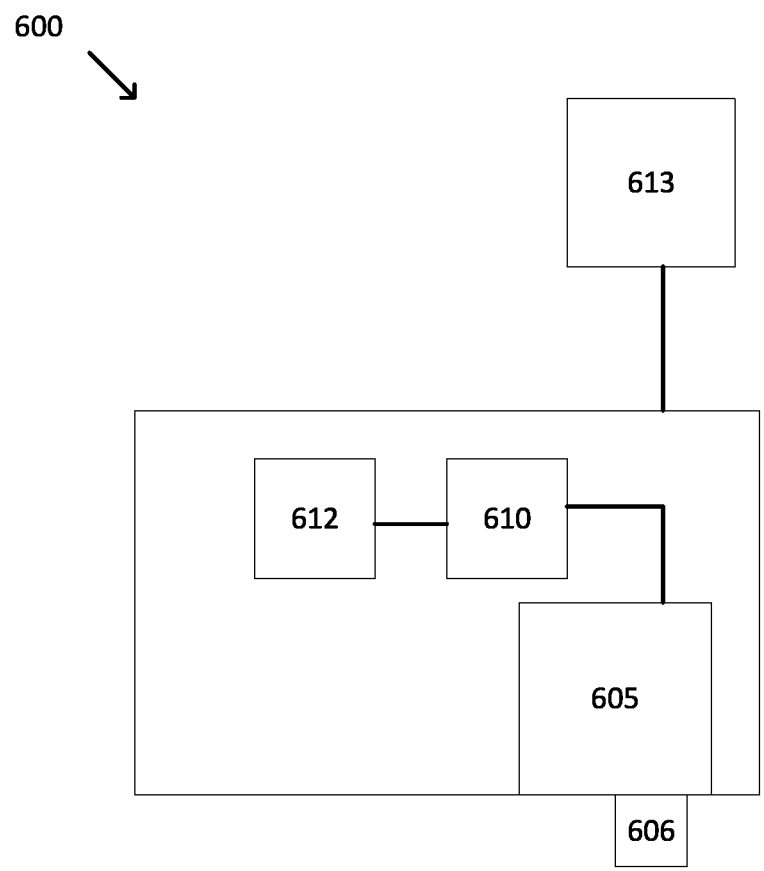
FIG. 6 is a schematic illustration of a camera system in accordance with an example embodiment.

An alternate embodiment of a camera system is illustrated in FIG. 6. The camera system 600 illustrated in FIG. 6 can be installed as a stand alone system in a ceiling or wall or can be installed in a luminaire similar to the examples described in FIGS. 1-5. Example camera system 600 lacks the transceiver component described in connection with FIGS. 1-5. Instead, the camera system 600 includes a user interface 606, which can be implemented as a button or a touch screen. The user interface 606 can be used to provide commissioning signals to the camera system 600. Camera system 600 also comprises one or more cameras 605, one or more processors 610, a memory 612, and a power supply 613. The power supply 613 can provide AC or DC power to the camera system 600 and can also provide power to a luminaire if the camera system is integrated in the luminaire. Executable instructions can be stored as software in the memory 612 and can be executed by the processor 610 to control the operation of the camera 605. The processor 610, memory 612, the camera 605, and the user interface 606 can communicate via a bus of the camera system 600.

Figure 7:
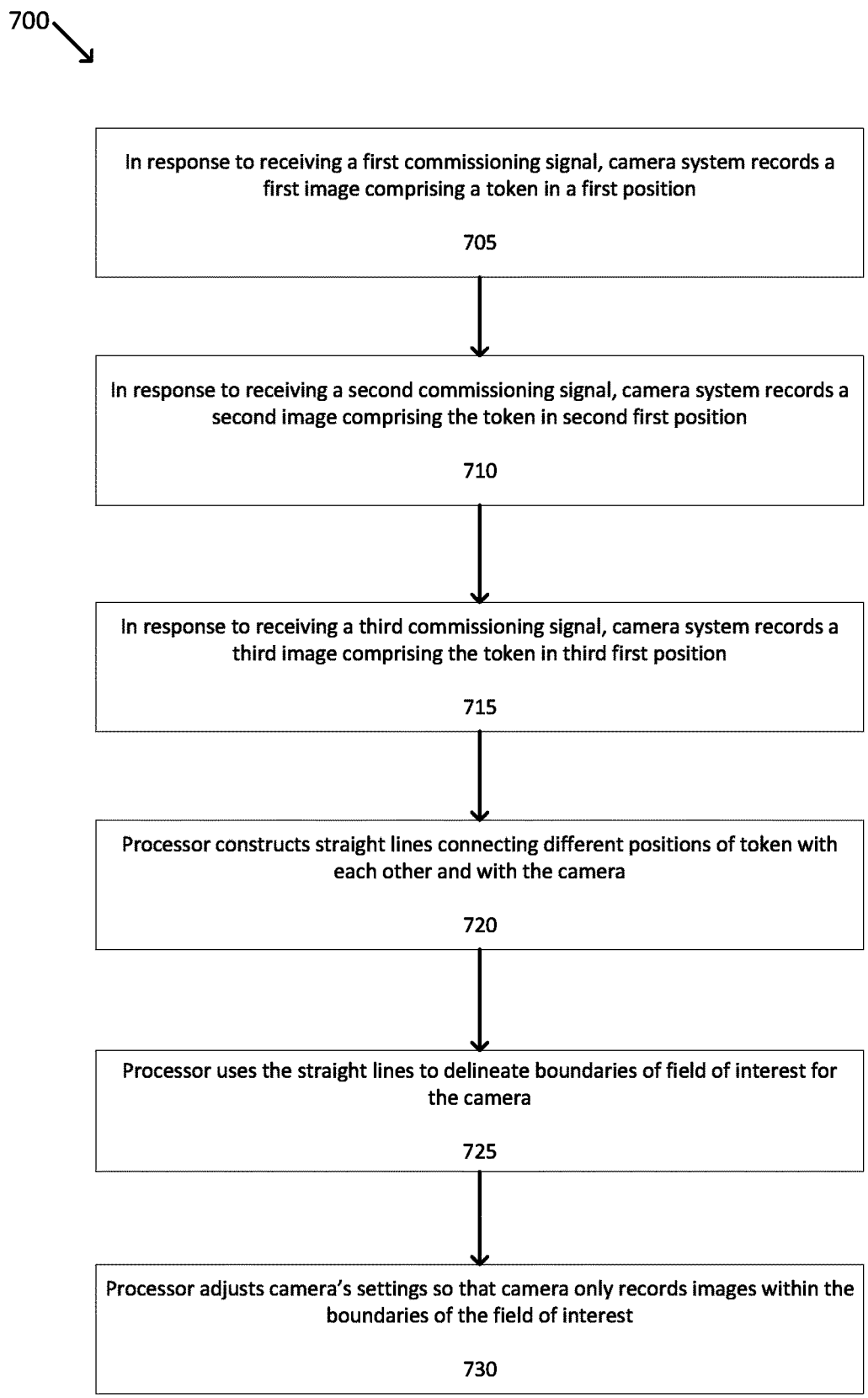
FIG. 7 illustrates an example method for commissioning a camera system in accordance with an example embodiment.

FIG. 7 illustrates an example of a method of commissioning camera system 600. Example method 700 is an alternate embodiment of the commissioning method previously described in connection with FIGS. 1-4. Beginning with step 705, in response to receiving a first commissioning signal, camera system 600 records a first image comprising a token in a first position. The first commissioning signal can be provided to the camera system 600 via the user interface 613. In step 710, in response to receiving a second commissioning signal, camera system 600 records a second image comprising the token in a second position. For example, a technician that is commissioning the camera system 600 can move the token to different positions to delineate the boundaries of the field of interest for the camera. In step 715, in response to receiving a third commissioning signal, camera system 600 records a third image comprising the token in a third position. In step 720, similar to the example illustration provided in FIG. 4, the processor 610 can construct straight lines connecting the different positions of the token in each recorded image and connecting the different positions of the token with the camera 605. In step 725, the processor uses the straight lines to delineate the boundaries of the field of interest for the camera 605. In step 730, the processor adjusts the camera's settings so that the camera only records images within the determined field of interest. It should be understood that in other embodiments a different number of images of tokens can be used and lines other than straight lines can be constructed by the processor to delineate the boundaries of the field of interest.

Figure 8:
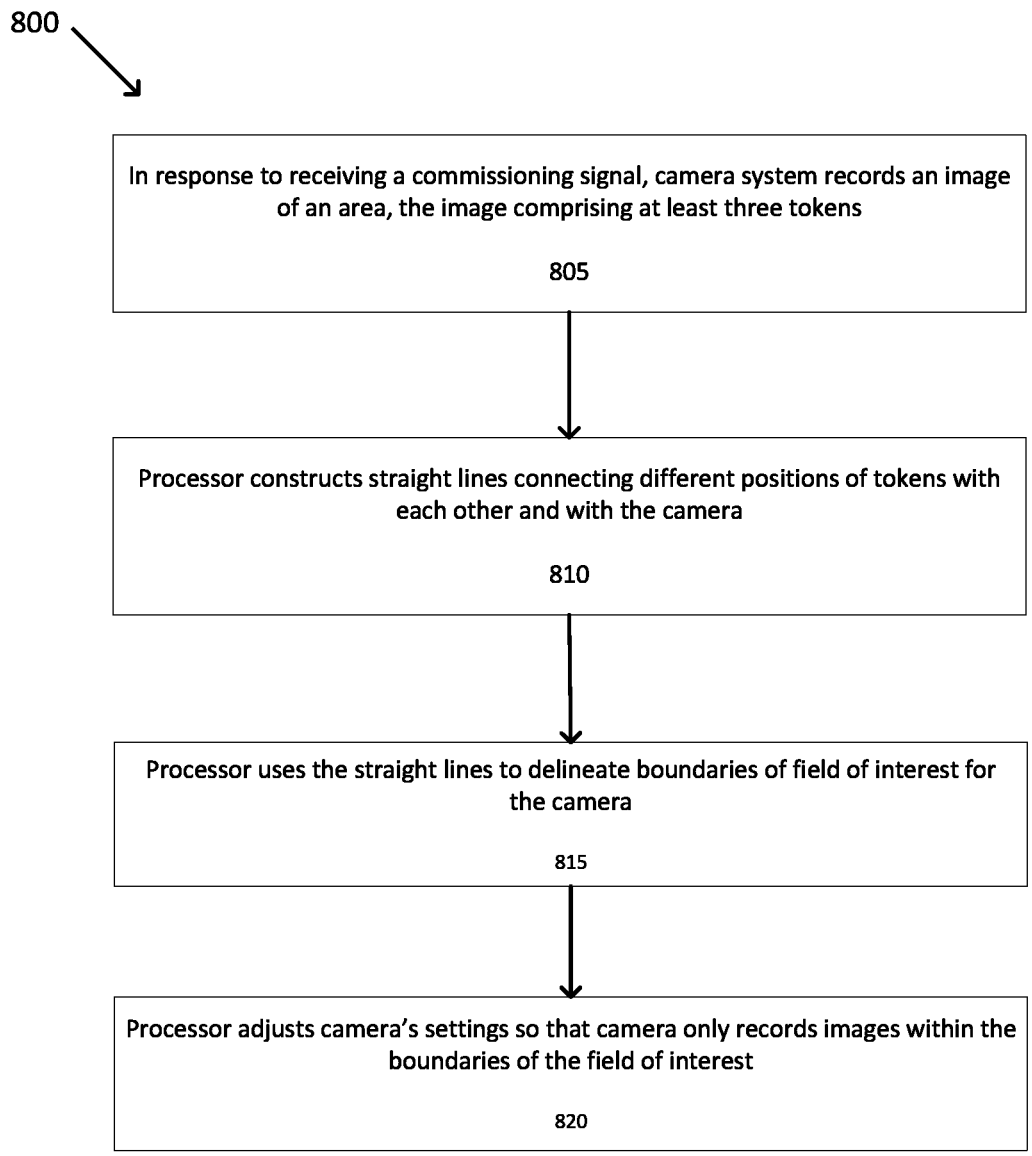
FIG. 8 illustrates an example method for commissioning a camera system in accordance with an example embodiment.

FIG. 8 illustrates another example of a method of commissioning camera system 600. Example method 800 is an alternate embodiment of the commissioning method previously described in connection with FIG. 5. Beginning with step 805, in response to receiving a commissioning signal, camera system 600 records an image of an area to which the camera is directed. The recorded image can comprise at least three tokens located in different positions throughout the area. In step 810, similar to the example illustrated in FIG. 5, the processor 610 can construct straight lines connecting the different positions of the tokens in the recorded image and connecting the different positions of the tokens with the camera 605. In step 815, the processor 610 uses the straight lines to delineate the boundaries of the field of interest for the camera 605. In step 820, the processor adjusts the camera's settings so that the camera only records images within the determined field of interest. It should be understood that in other embodiments a different number of tokens can be used and lines other than straight lines can be constructed by the processor to delineate the boundaries of the field of interest.

The example methods and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope of the disclosure. Accordingly, such alternative embodiments are included in the disclosure described herein.

As explained previously, the example embodiments can include one or more computer programs or sets of computer-executable instructions that embody the functions described herein and illustrated in the appended flow charts. The computer programs or instructions can be stored in memory and executed by the processor that is a part of the camera system. However, it should be apparent that there could be many different ways of implementing aspects of the example embodiments in computer programming, and these aspects should not be construed as limited to one set of computer instructions. Further, a skilled programmer would be able to write such computer programs to implement example embodiments based on the flow charts and associated description in the application text. Therefore, disclosure of a particular set of program code instructions is not considered necessary for an adequate understanding of how to make and use the example embodiments. Further, those skilled in the art will appreciate that one or more acts described may be performed by hardware, software, or a combination thereof, as may be embodied in one or more computing systems.

The example embodiments described herein can be used with computer hardware and software that perform the methods and processing functions described previously. The systems, methods, and procedures described herein can be embodied in a programmable controller, computer-executable software, or digital circuitry. The software can be stored on tangible non-transitory computer-readable media. For example, computer-readable media can include ROM, a hard disk, removable media, flash memory, a memory stick, optical media, magneto-optical media, CD-ROM, etc. Digital circuitry can include integrated circuits, gate arrays, building block logic, field programmable gate arrays (FPGA), etc.

The cameras described herein can record images and/or video for monitoring of a site, but it should be understood that the cameras can also serve a variety of functions. As non-limiting examples, the cameras can support functions such as occupancy/vacancy detection for light level adjustments or other environmental controls, daylight detection for light level adjustments, natural versus artificial light comparison for real-time light level tuning, counting the number of people, vehicles, or animals that pass by the camera, following people's directional movements for automatic light level control, sensing intelligent visible light communication from user devices for programming and user controls, facial recognition for identifying individuals, and intelligent gesture control.

Example embodiments provide a number of benefits. Examples of such benefits can include, but are not limited to, more efficient installation, configuration, control, replacement, modification, and maintenance of a camera or system of cameras; improved operational efficiency; compliance with one or more applicable standards and/or regulations; lower maintenance costs, increased flexibility in system design and implementation; and reduced cost of labor, installation and maintenance. Example embodiments can be used for installations of new luminaires, retrofitting existing luminaires, or installation of cameras without luminaires.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method for commissioning a camera system, wherein the camera system comprises a camera, a processor, and a memory, the method comprising:
receiving, at the camera system, a commissioning signal;
recording, with the camera system in response to the commissioning signal, an image, the image comprising
at least a first token in a first position,
a second token in a second position, and
a third token in a third position, wherein each of the first, second, and third tokens include a directional indicator, wherein the directional indicator is identifiable, by the camera system, from the image and used to determine the field of interest; and
computing, by the camera system, a field of interest boundary for a visual field of the camera system based on the first position, the second position, and the third position and the directional indicator of each token.

2. The method of claim 1, wherein the field of interest boundary defines an area that is less than the visual field of the camera.

3. The method of claim 1, wherein a receiver of the camera system receives the commissioning signal from a commissioning device via wireless communication signals.

4. The method of claim 1, wherein the camera system does not communicate the image beyond the camera system.

5. The method of claim 1, wherein the field of interest boundary is computed by connecting the first position, the second position, and the third position based at least in part on the directional indicator of at least one of the tokens so that an area defined by the field of interest boundary is maximized.

6. The method of claim 1, wherein the memory of the camera system comprises a size of at least one of the first, second, and third tokens, and wherein the processor computes a pixel scale based on the size of the at least one token.

7. A non-transitory computer-readable medium comprising instructions that when executed by a processor of a camera system perform the following steps:
receiving, at the camera system, a commissioning signal;
recording, with the camera system in response to the commissioning signal, an image, the image comprising
a token in a first position,
a second token in a second position, and
a third token in a third position, wherein each of the first, second, and third tokens include a directional indicator, wherein the directional indicator is identifiable, by the camera system, from the image and used to determine the field of interest; and
computing, by the camera system, a field of interest boundary for a visual field of the camera system based on the first position, the second position, and the third position and the directional indicator of each token.

8. The non-transitory computer-readable medium of claim 7, wherein a receiver of the camera system receives the commissioning signal from a commission device via wireless communication signals.

9. The non-transitory computer-readable medium of claim 7, wherein the camera system does not communicate the image beyond the camera system.

10. The non-transitory computer-readable medium of claim 7, wherein the field of interest boundary is computed by connecting the first position, the second position, and the third position based at least in part on the directional indicator of at least one of the tokens so that an area defined by the field of interest boundary is maximized.

11. The non-transitory computer-readable medium of claim 7, wherein a memory of the camera system comprises a size of at least one of the first, second, and third tokens, and wherein the processor computes a pixel scale based on the size of the at least one token.

12. A method for commissioning a camera system, wherein the camera system comprises a camera, a processor, and a memory, the method comprising:
receiving at the camera system, a commissioning signal;
recording, with the camera system in response to the commissioning signal, an image, the image comprising
a first token in a first position, a second token in a second position, and a third token in a third position, wherein each of the first, second, and third tokens include a directional indicator, wherein the directional indicator is identifiable, by the camera system, from the image and used to determine the field of interest; and
computing, by the processor, a field of interest boundary for a visual field of the camera based on the first position, the second position, and the third position and the directional indicator of each token.

13. The method of claim 12, wherein a receiver of the camera system receives the commissioning signal from a commissioning device via wireless communication signals.

14. The method of claim 13, wherein the receiver of the camera system does not communicate the image beyond the camera system.

15. The method of claim 13, wherein the commissioning device communicates with the receiver via one of a radio transmission, a visible light transmission, and an infrared light transmission.

16. The method of claim 12, wherein the field of interest boundary is computed by connecting the first position, the second position, and the third position based at least in part on the directional indicator of at least one of the tokens so that an area defined by the field of interest boundary is maximized.

17. The method of claim 12, wherein the first token, the second token, and the third token each comprise a numerical indicator, wherein the numerical indicator is used to compute the field of interest boundary.

18. The method of claim 12, wherein the processor receives a size of at least one of the first, second, and third tokens, and wherein the processor computes a pixel scale based on the size of the at least one token.

* * * * *